United States Patent
Tourapis et al.

(10) Patent No.: US 10,757,445 B2
(45) Date of Patent: Aug. 25, 2020

(54) TECHNIQUES FOR RESOURCE CONSERVATION DURING PERFORMANCE OF INTRA BLOCK COPY PREDICTION SEARCHES

(71) Applicant: Apple Inc., Cupertino, CA (US)

(72) Inventors: Alexandros Tourapis, Milpitas, CA (US); David W. Singer, San Francisco, CA (US); Haitao Guo, San Jose, CA (US); Hsi-Jung Wu, San Jose, CA (US); Sorin C. Cismas, Saratoga, CA (US); Xiaohua Yang, San Jose, CA (US); Yeping Su, Sunnyvale, CA (US); Dazhong Zhang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/173,105

(22) Filed: Oct. 29, 2018

(65) Prior Publication Data
US 2019/0068992 A1    Feb. 28, 2019

Related U.S. Application Data

(62) Division of application No. 15/172,064, filed on Jun. 2, 2016, now abandoned.

(60) Provisional application No. 62/170,373, filed on Jun. 3, 2015.

(51) Int. Cl.
| | |
|---|---|
| *H04N 19/593* | (2014.01) |
| *H04N 19/156* | (2014.01) |
| *H04N 19/44* | (2014.01) |
| *H04N 19/176* | (2014.01) |
| *H04N 19/182* | (2014.01) |
| *H04N 19/174* | (2014.01) |

(52) U.S. Cl.
CPC ......... *H04N 19/593* (2014.11); *H04N 19/156* (2014.11); *H04N 19/176* (2014.11); *H04N 19/182* (2014.11); *H04N 19/44* (2014.11); *H04N 19/174* (2014.11)

(58) Field of Classification Search
CPC ............................ H04N 19/593; H04N 19/44
See application file for complete search history.

(56) References Cited

U.S. PATENT DOCUMENTS

| | | |
|---|---|---|
| 2007/0064803 A1 | 3/2007 | Miao et al. |
| 2008/0031329 A1 | 2/2008 | Iwata et al. |
| 2014/0376634 A1 | 12/2014 | Guo et al. |
| 2015/0261884 A1* | 9/2015 | Pang .................. G06F 16/9024 707/741 |

(Continued)

OTHER PUBLICATIONS

C. Pang, J. Sole, L. Guo, R. Joshi, & M. Karczewicz, "AhG5: Fast encoder search and search region restriction for intra block copying", JCT-VC Document No. O0156 (Nov. 2013) (Year: 2013).*

(Continued)

*Primary Examiner* — David N Werner
(74) *Attorney, Agent, or Firm* — BakerHostetler

(57) ABSTRACT

Methods are described for encoding and decoding blocks of image data using intra block copying (IBC). A source block for intra block copying is selected from a source region of a current image that is closer to the current block than a threshold, wherein the source region does not include a portion of the current image that is further from the current block than the threshold.

21 Claims, 5 Drawing Sheets

(56) References Cited

U.S. PATENT DOCUMENTS

| | | | | |
|---|---|---|---|---|
| 2015/0264386 A1* | 9/2015 | Pang | ...................... | H04N 19/52 375/240.16 |
| 2015/0341643 A1* | 11/2015 | Xu | ...................... | H04N 19/593 375/240.02 |
| 2015/0373325 A1* | 12/2015 | Karczewicz | ......... | H04N 19/503 375/240.13 |
| 2016/0105682 A1* | 4/2016 | Rapaka | .................. | H04N 19/11 375/240.12 |
| 2016/0227214 A1* | 8/2016 | Rapaka | ................ | H04N 19/593 |

OTHER PUBLICATIONS

N. Parnnar & M.H. Sunwoo, "Enhanced Test Zone Search Motion Estimation Algorithm for HEVC", 2014 Int'l SoC Design Conf. 260-261 (2014) (Year: 2014).*

C. Pang, J. Sole, L. Guo, R. Joshi, & M. Karczewicz, "AhG5: Constrated intra prediction for intra block copying", JCT-VC Document No. O0155 (Nov. 2013) (Year: 2013).*

Luo, "Fast Adaptive Block Based Motion Estimation for Video Compression", A dissertation presented to the faculty of the Russ College of Engineering and Technology of Ohio University, Jun. 2009, pp. 1-200.

Muralidhar et al., "Efficient Block Matching Algorithms for Motion Estimation in H.264/AVC", ICTACT Journal on Image and Video Processing, Feb. 2015, vol. 05, issue 03, (online), pp. 984-990.

Pang et al., "Intra Block Copy with Larger Search Region", Joint Collaborative Team on Video Coding (JCT-VC) of ITU-T SG 16 WP 3 and ISO/IEC JTC 1/SC 29/WG 11 17th Meeting: Valencia, ES, Mar. 27, 2014-Apr. 4, 2014, pp. 1-6.

Alshina et al., "AhG5: Intra Block Copy within one LCU", Joint Collaborative Team on Video Coding (JCT-VC) of ITU-T SG 16 WP 3 and ISO/IEC JTC 1/SC 29/WG 11 15th Meeting: Geneva, C11, Oct. 23, 2013-Nov. 1, 2013, pp. 1-6.

Recommendation ITU-T H.265, Ver. 3—Series H: Audiovisual and Multimedia Systems—Infrastructure of audiovisual services—Coding of Moving video, High Efficiency Video Coding, International Telecommunication Union, Apr. 2015.

* cited by examiner

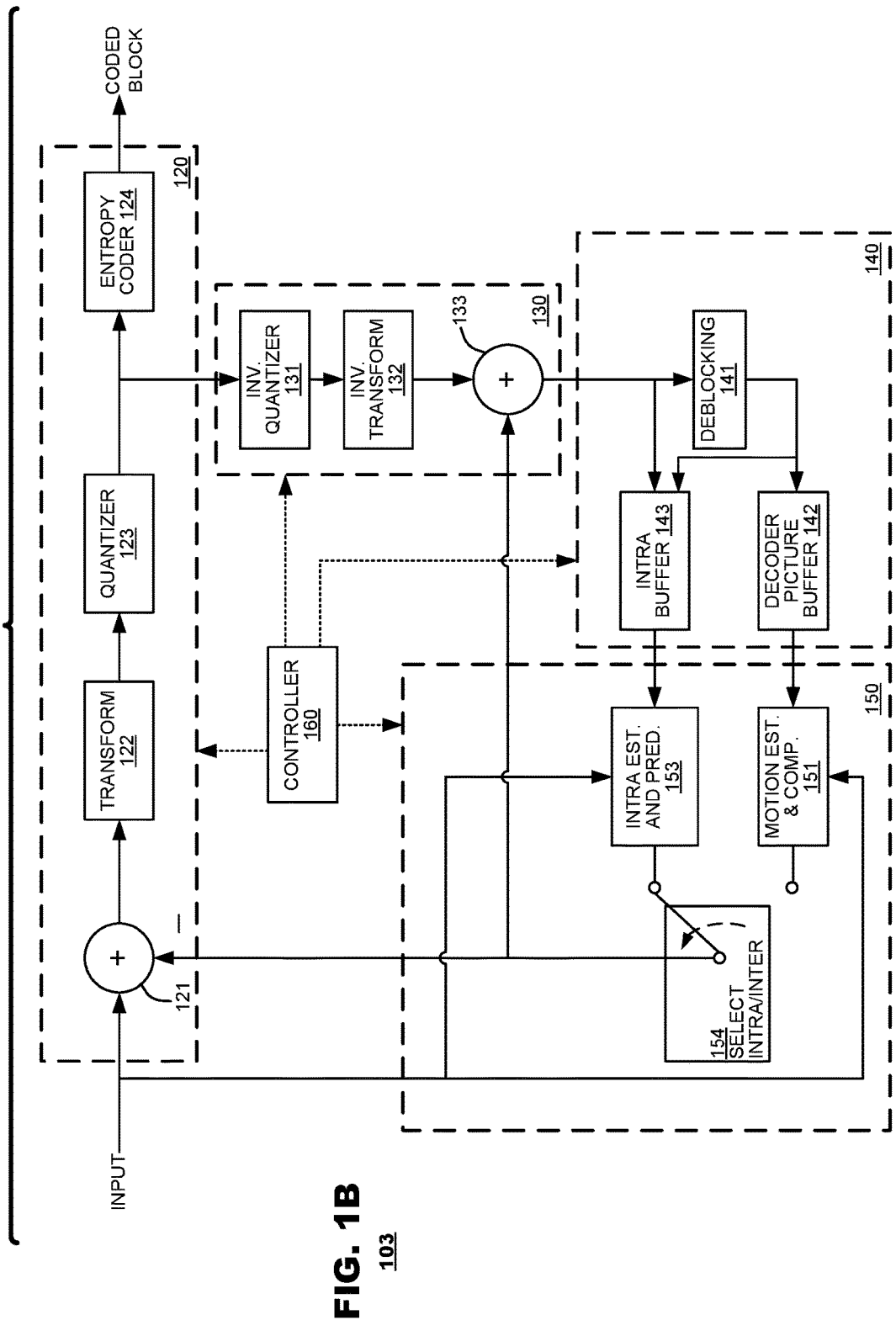
FIG. 1A
100
FIG. 1B
103

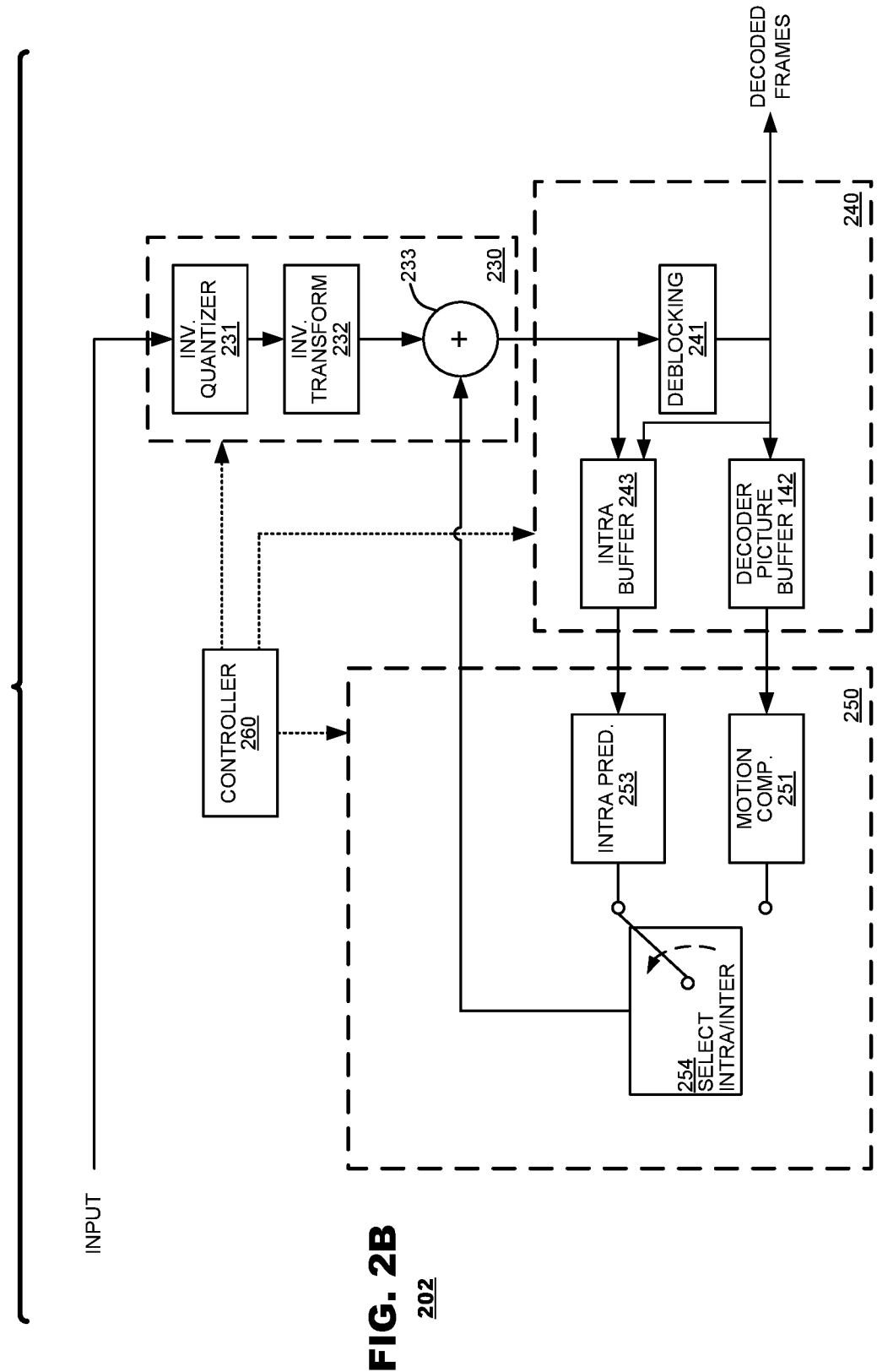

300

320

340

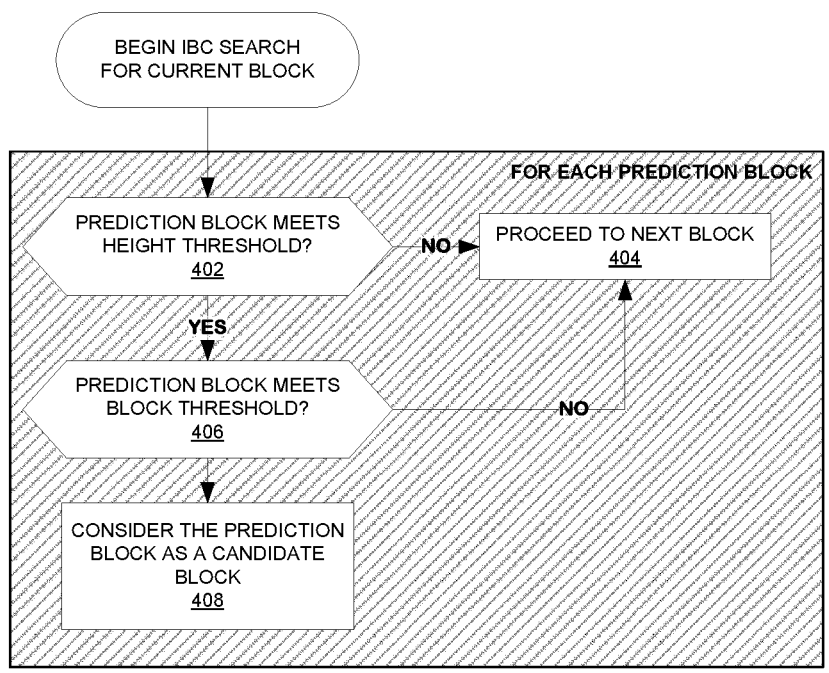
FIG. 4
400
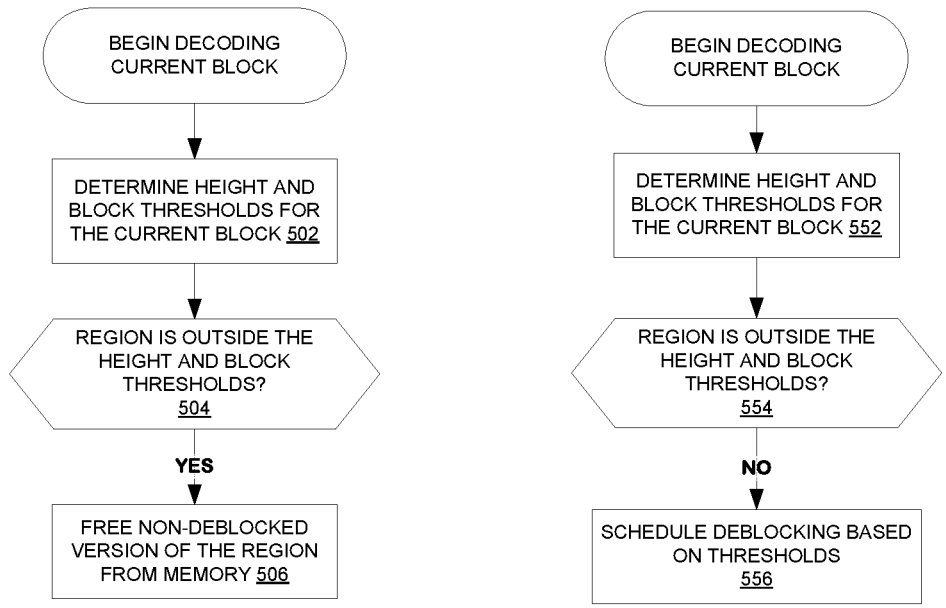
FIG. 5A
500
FIG. 5B
550

TECHNIQUES FOR RESOURCE CONSERVATION DURING PERFORMANCE OF INTRA BLOCK COPY PREDICTION SEARCHES

CLAIM FOR PRIORITY

This application is a Divisional Application of U.S. patent application Ser. No. 15/172,064, filed Jun. 2, 2016, which claims benefit under 35 U.S.C. § 119(e) of Provisional U.S. patent application No. 62/170,373, filed Jun. 3, 2015, the contents of which are incorporated herein by reference in their entirety.

BACKGROUND

The present disclosure relates to video coding techniques. In particular, the present disclosure relates to video coding, such as, but not limited to, the case of screen content coding, i.e. coding of screen content video. Screen content may include a mixture of content such as video, text, and graphics and, in some cases, non-camera captured content. In one aspect, the present disclosure relates to intra block copying (IBC). In another aspect, the present disclosure relates to deblocking filtering (DBF).

Modern video codecs such as MPEG-4 AVC/H.264 or HEVC (currently published as ISO/IEC 23008-2 MPEG-H Part 2 and ITU-T H.265) may include techniques such as IBC and deblock filtering to handle video coding, including screen content coding. IBC is a block matching technique in which, for a coding unit (CU) within a largest coding unit (LCU), the CU is predicted as a displacement from an already-reconstructed block of samples from a previously coded neighboring region in the current picture. For instance, a vector pointing to an already encoded/decoded area in the image may be specified and the referenced data may be used as a prediction signal for the current CU. DBF reduces blocking artifacts that arise due to block-based coding. DBF is typically an in-loop process applied to reconstructed samples before writing them into a decoded picture buffer in a decoder loop.

Traditional video coding techniques are inefficient in that they are complex and consume a relatively large amount of memory and/or bandwidth. Therefore, the inventor(s) perceived a need in the art for improved and simplified encoding and decoding processes with respect to both complexity and quality. The encoding and decoding processes described here reduce memory and bandwidth consumption, resulting in an improved experience at the decoder compared to conventional encoders, and may reduce blockiness, improve resolution and subjective quality, as well as reduce other artifacts and improve compression.

BRIEF DESCRIPTION OF THE DRAWINGS

FIG. 1A is a simplified block diagram of an example video encoding system.

FIG. 1B illustrates an example coding engine.

FIG. 2A is a simplified block diagram of an example video decoding system.

FIG. 2B illustrates an example decoding engine.

FIG. 4 is a flowchart of an example method to encode data according to an embodiment of the present disclosure.

FIG. 5A is an example flowchart of a method to decode data according to an embodiment of the present disclosure.

FIG. 5B is a flowchart of an example method 450 to decode data according to another embodiment of the present disclosure.

DETAILED DESCRIPTION

Figure 3A:
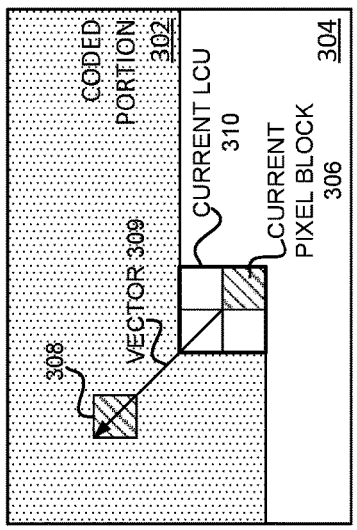
FIG. 3A is a conceptual diagram of an example video encoding using IBC according to a conventional method.

Methods and systems of the present disclosure provide techniques for video coding, including but not limited to screen content coding. In an embodiment, techniques for intra block copying (IBC) define a search area of previously-coded blocks in the picture, tile, or slice currently being encoded, that can be used for prediction of a block that is currently being coded. The search area may be defined by a height and/or a number of preceding blocks. The methods and systems of the present disclosure may improve efficiency of intra prediction by reducing space used for memory storage and computational complexity. The same concepts can also enable an encoder or decoder to better schedule/pipeline some processing components, such as in-loop deblocking and the sample adaptive offset (SAO) operation, given the information that they provide. In another embodiment, techniques for deblocking filtering (DBF) provide improved chroma DBF by optionally applying and controlling a different, e.g. stronger, DBF to the chroma components than is conventionally used.

A video communication system may include transmission of video data from a source terminal to a destination terminal. The source terminal may include the encoder system 100 to reduce the bitrate and format the video data for transmission over a communication channel to the destination terminal. At the destination terminal, a decoder system may convert the received video data, for example, to be displayed on a video monitor.

FIG. 1A is a simplified block diagram of an example video encoding system 100 as may be used in a source terminal of a video communication system, according to an embodiment of the present disclosure. The encoding system 100 may include a video source 101, a pre-processor 102, a coding engine 102, a format buffer 104, and a transmitter 105. The video source 101 may supply source video data to the rest of the system 100. Common video sources 101 include cameras that capture video data representing local image data and storage units that store video data generated by some other system (not shown). Typically, the video data is organized into frames of image content.

The pre-processor 102 may perform various analytical and signal conditioning operations on video data. For example, the pre-processor 102 may apply various filtering operations to the frame data to improve efficiency of coding operations applied by a video coding engine 103. The pre-processor 102 may also perform analytical operations on the source video data to derive statistics of the video, which may be provided to the controller 160 of FIG. 1B to otherwise manage operations of the video coding system 100.

FIG. 1B illustrates a coding engine, according to an embodiment, which may find application as the coding engine 103 of FIG. 1A. The coding engine 103 may include a block coder 120, a block decoder 130, a frame reassembly system 140, and a prediction system 150, all operating under control of a controller 160. The block coder 120 is a forward coding chain that encodes pixel blocks for transmission to a decoder. A pixel block is a group of pixels that may be of different sizes in different embodiments, and a pixel block may correspond to the constructs at work in different protocols. A pixel block may correspond, for example, to either a block or a macroblock in the Moving Picture Experts Group (MPEG) video coding standards MPEG-2, MPEG-4 Part 2, H.263, or MPEG-4 AVC/H.264, or to either a coding unit (CU) or largest coding unit (LCU) in the HEVC/H.265 video coding standard. The block coder 120 may include a subtractor 121, a transform unit 122, a quantizer unit 123, and an entropy coder 124. The block decoder 130, frame reassembly system 140, and prediction system 150 together form a prediction loop. A portion of the prediction loop, including the block decoder 130 and prediction system 150, operates on a pixel block-by-pixel block basis, while the remainder of the prediction loop, including frame reassembly system 140, operates on multiple pixel blocks at a time, including operating on whole frames. The block decoder 130 may include an inverse quantizer unit 131, an inverse transform unit 132, and an adder 133. The frame reassembly system 140 may include a de-blocking unit 141, a decoder picture buffer (DPB) 142, and an intra buffer 143. The prediction system 150 may include a motion estimation and compensation unit 151, an intra-mode estimation and prediction unit 153, and an intra/inter-mode selector 154.

As depicted in FIG. 1B, the prediction loop has two data paths, one for inter-coding, and the other for intra-coding. The inter-coding path is the lower data path in FIG. 1B and includes inverse quantizer unit 131, inverse transform unit 132, adder 133, de-blocking unit 141, DPB 142, and the motion estimation and compensation unit 151. The intra-coding is the upper data path in FIG. 1B and includes inverse quantizer unit 131, inverse transform unit 132, adder 133, intra prediction buffer 143, and intra-mode estimation and prediction unit 153. Note the elements of block decoder 130 are used for both inter-coding and for intra-coding.

The subtractor 121 may receive an input signal and generate data representing a difference between a source pixel block and a reference block developed for prediction. The transform unit 122 may convert the difference to an array of transform coefficients, e.g., by a discrete cosine transform (DCT) process or wavelet transform. The quantizer unit 123 may quantize the transform coefficients obtained from the transform unit 122 by a quantization parameter QP. The entropy coder 124 may code the quantized coefficient data by run-value coding, run-length coding, arithmetic coding, or the like, and may generate coded video data, which is output from the coding engine 103. The output signal may then undergo further processing for transmission over a network, fixed media, etc. The output of the entropy coder 124 may be transmitted over a channel to a decoder, terminal, or data storage. In an embodiment, information can be passed to the decoder according to decisions of the encoder. The information passed to the decoder may be useful for decoding processes and reconstructing the video data.

Embodiments of coding engine 103 may include a prediction loop. The inverse quantizer 131 may be coupled to the quantizer 123. The inverse quantizer 131 may reverse the quantization performed by the quantizer 123. The inverse transform unit 132 may apply an inverse transform on the inverse-quantized data. The inverse transform unit 132 may be complementary to the transform unit 122 and may reverse its transform operations. The adder 133 may be coupled to the inverse transform unit 132 and may receive, as an input, the inverse transformed data generated by the inverse transform unit 132. The adder 133 may also receive an input generated by the intra/inter selector 152. That is, a prediction signal, which may be generated by the intra/inter selector 152, may be added to the residual via the adder 133. The adder 133 may combine its inputs and output the result to the deblocking unit 134 and the intra buffer 138. Typically, the operations of the block coder 120 and block decoder 130 are lossy operations, due in part to loss of data incurred by quantization, and therefore, the pixel blocks recovered by the block decoder 130 will be a facsimile of the source pixel blocks that were input to the block coder 120.

Embodiments may include in-loop processing in the coding processes described above. For example, DBF may be performed within the prediction loop. The deblocking unit 141 may include a DBF to remove artifacts of block encoding. The filtered output may then be stored in the DPB 142, which may store previously decoded data. Although not shown, other filtering processes such as SAO filtering may be performed in conjunction with, before, or after DBF.

The de-blocking filter 141 may receive output of the adder 133 (for example, a mode output by intra/inter selector 152 and passed to the de-blocking filter 141 via controller 160) and an inverse transformed data output of the inverse transform unit 132. Based on received information, the de-blocking filter 141 may reduce blocking artifacts due to block-based coding.

The motion estimation and compensation unit 151 may receive the input signal and the decoded data from DPB 142. Based on received information, the motion estimator and compensation unit 151, for each desired reference, may derive motion information that would result in an inter prediction hypothesis for the current block to be coded.

The intra-mode estimation and prediction unit 151 may receive the input signal and data output by the adder 133. In an embodiment, the data output by the adder 133 may be stored in the intra buffer 143. The intra buffer 143 may store a partial image, where the image has not been subject to in-loop processes such as deblocking, SAO filtering, etc. Based on received information, the intra-mode estimation and prediction unit 153 may estimate the "best" intra coding mode for the current block to be coded. IBC may be performed as part of the intra-mode estimation and prediction, as described herein. Alternatively, IBC can be considered as part of inter-mode estimation, since IBC can be emulated as a motion compensation process from a reference that corresponds to the current picture that is being encoded. In this scenario, only the areas in the current picture, slice, or tile that have already been encoded are available for prediction.

Alternate embodiments of frame reassembly system 140 are possible. For example, intra buffer 143 and decoder picture buffer 142 may be combined in a single memory buffer (not depicted). In some embodiments IBC predictions may be made from image samples before in-loop processing, such as with de-blocking filter 141, while in other embodiments the IBC predictions may be made after in-loop processing. In further embodiments both are possible, such as where an encoder may choose whether to make predictions from samples before or after in-loop processing depending on whichever is the better basis for prediction. Where embodiments of frame reassembly system 140 with a combined buffer for pre- and post-in-loop processing, buffer management techniques can track which samples, blocks or frames in the buffer have been processed by in-loop processing, and which have not. Predictions from samples post-in-loop processing will be delayed or not scheduled until in-loop processing of the referenced samples is complete. For example, groups of samples, such as blocks, macroblocks, CUs, LCUs, slices, or frames, may be marked with a flag when first output from adder 133. Following in-loop processing, the flag can be cleared. Estimation and prediction elements 151 and 153, in conjunction with controller 160, can then be used to determine when a group of samples can be used for prediction.

The intra/inter selector 154 may select between an intra-prediction mode (represented by the intra-mode estimation and prediction unit 153) and an inter-prediction mode (represented by the motion estimation and compensation unit 151). In an embodiment, for intra slices/tiles/pictures, only intra prediction modes are available. Based on received information the intra/inter selector 154 may select a mode of operation for the current block or frame to be coded. For example, the intra/inter selector 154 may select from a variety of mode/prediction types, block sizes, reference modes, or even perform slice/frame level coding decisions including: use of intra, or single or multi-hypothesis (commonly bi-predictive) inter prediction; the size of the prediction blocks; whether a slice/picture shall be coded in intra (I) mode without using any other picture in the sequence as a source of prediction; whether a slice/picture shall be coded in single list predictive (P) mode using only one reference per block when performing inter predictions, in combination with intra prediction; whether a slice/picture shall be coded in a bi-predictive (B) or multi-hypothesis mode, which allows, apart from single list inter and intra prediction the use of bi-predictive and multi-hypothesis inter prediction, use or not of weighted prediction; and any other mode available to the encoder.

FIG. 2A is a simplified block diagram of an example video decoding system 200 as may be used in a destination terminal of a video communication system, according to an embodiment of the present disclosure. The encoding system 200 may include a receiver 201, decoding engine 202, post-processing unit 203, and display 204. The receiver 201 receives encoded video from a communications channel that may include, for example, a computer network or local storage such as a harddisk. Encoded video received at the receiver 201 may have been encoded, for example, by the video encoder 100 of FIG. 1A. Post-processor 203 may apply various filtering operations to the frame data of the decoded video, for example to resize the video for display 204. Display 204 may present decoded video to a viewer.

FIG. 2B illustrates an example decoding engine, such as decoding engine 202 of FIG. 2A. Decoding engine 202 may include a block decoder 230, a frame reassembly system 240 and a prediction system 250, all operating under control of a controller 260. The block decoder 230, frame reassembly system 240, and prediction system 250 together form a prediction loop. A portion of the prediction loop, including the block decoder 230 and prediction system 250, operates on a pixel block-by-pixel block basis, while the remainder of the prediction loop, including frame reassembly system 240, operates on multiple pixel blocks at a time, including operating on whole frames. As in FIG. 1B, a pixel block may be of different sizes in different embodiments and may correspond, for example, to a macroblock in the MPEG-2, MPEG-4 part 2, H.263, or MPEG-4 AVC/H.264 video coding standards or a coding unit (CU) or a largest coding unit (LCU) in the HEVC video coding standard.

The block decoder 30 may include an inverse quantizer unit 231, an inverse transform unit 232, and an adder 233. The frame reassembly system 240 may include a de-blocking unit 241, a decoder picture buffer 242, and an intra buffer 243. The prediction system 250 may include a motion compensation unit 251, an intra-mode prediction unit 253, and an intra/inter-mode selector 254. The block decoder 230, frame reassembly system 240, and prediction system 250 may operate similarly to corresponding elements block decoder 130, frame reassembly system 140, and prediction system 150 of FIG. 1B. In alternate embodiments, frame reassembly system 240 may include a combined intra buffer and decoder picture buffer, as described regarding the encoding engine of FIG. 1B above.

IBC in the HEVC standard is conventionally treated as analogous to an inter prediction mode, however, instead of using samples from previously coded pictures, already encoded samples from the picture currently being encoded are used. An IBC block is a predictively or bipredictively coded block that uses pixel blocks from a current picture. Bipredictively coded IBC blocks may use pixel blocks also from a different picture. According to conventional screen content coding techniques, the reference samples for IBC may be treated as a new reference picture that has been added into the DPB. The same operations, such as weighted prediction and reordering, also can apply. IBC regions can be combined with inter regions for prediction, i.e., a combined inter/intra biprediction. An IBC block is not explicitly recognized through a mode, but is instead recognized through a corresponding reference index. That is, the reference index may indicate whether the reference corresponds to a current picture or a different picture.

Figure 3B:
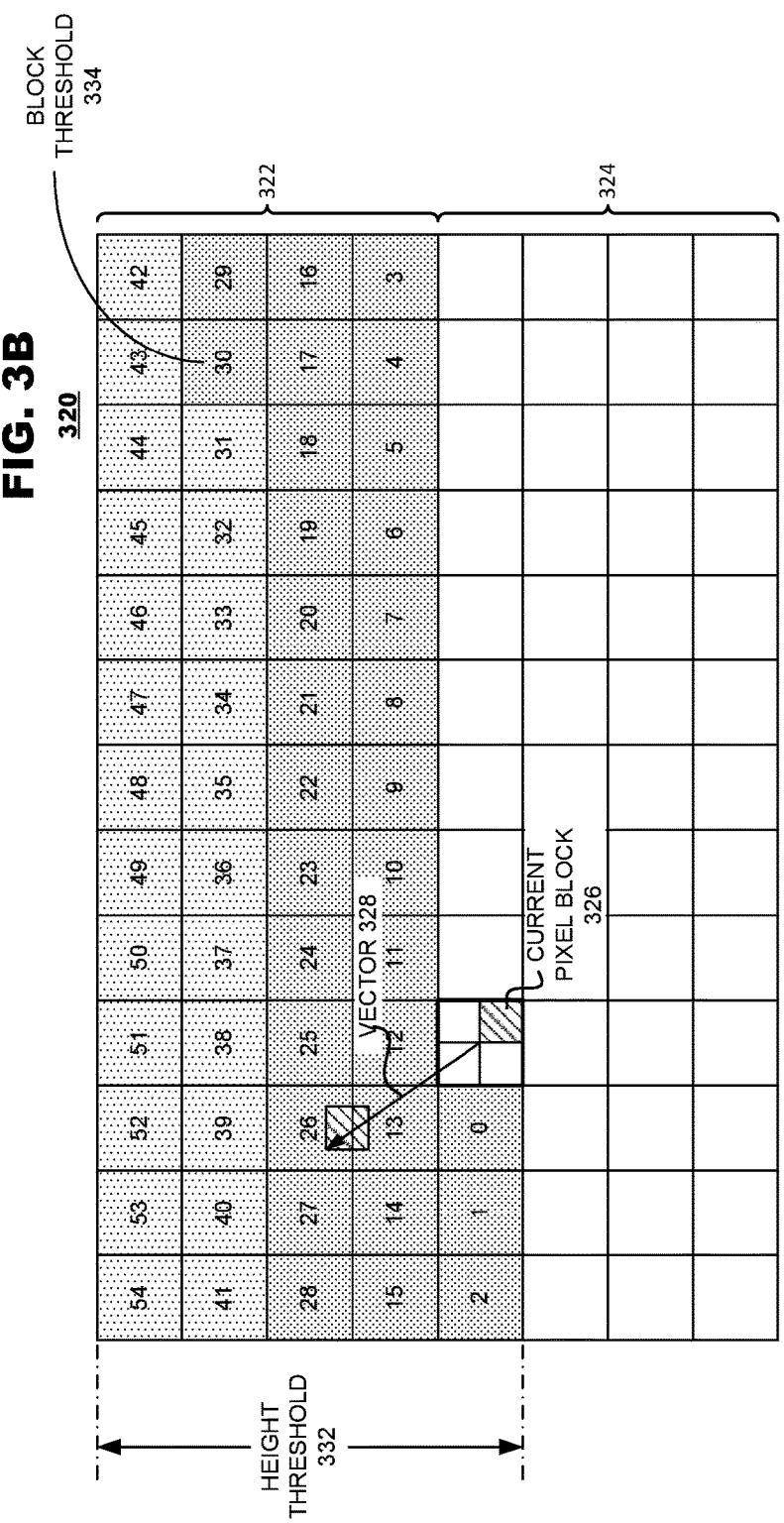
FIG. 3B is a conceptual diagram of an example video encoding using IBC according to an embodiment of the present disclosure.
Figure 3C:
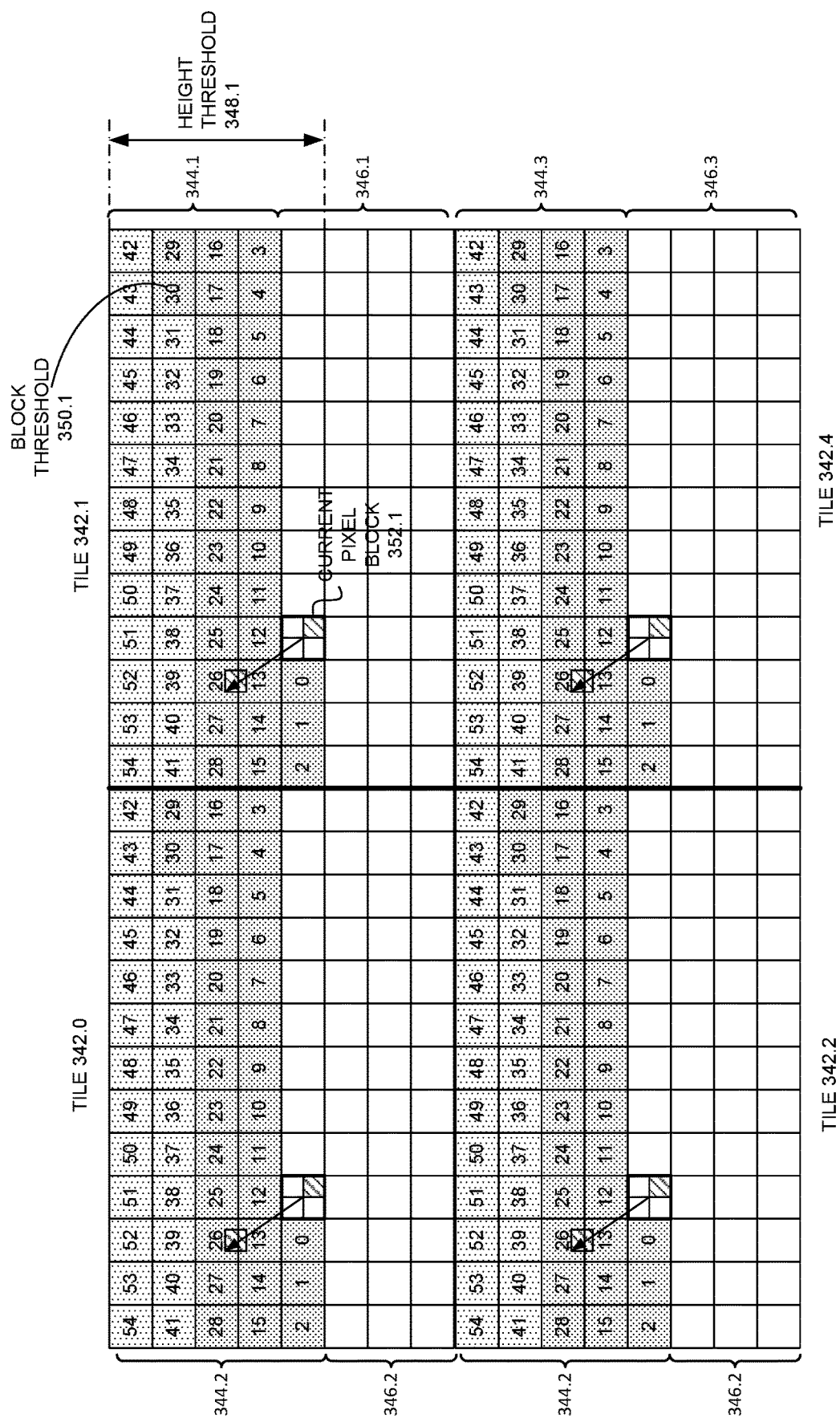
FIG. 3C is a conceptual diagram of an alternate example video encoding using IBC according to an embodiment of the present disclosure.

FIG. 3A is a conceptual diagram of video encoding using IBC according to a conventional method. FIG. 3A shows a partially reconstructed picture 300 having a first portion 302 that is coded (represented by the shaded portion) and another portion 304 that is not yet coded. In the embodiment of FIG. 1B, the coded portion 302 may, for example, be stored in intra buffer 143. When coding a not yet coded pixel block 306, prediction may be made with reference to a source pixel block 308 that has already been reconstructed. In the embodiments of FIGS. 3A, 3B, and 3C, IBC operates on pixel blocks that are a subset of an LCU. For example, current pixel block 306 (indicated with stripes) is the lower right corner of current LCU 310 (indicated with a dark boarder). As shown, when coding a current pixel block 306, prediction may be made with reference to a vector 309 pointing to a pixel block 308 in the already coded portion 302. The decision to reference an already-coded block 308 may be based on expected similarity between the already-coded block 308 and the current block 306. However, conventional IBC techniques require additional memory, external memory access, and complexity because the already-coded portions 302 need to be stored in their entirety so they can be referenced. In particular, encoding becomes computationally expensive due to searching and identification of self-similarities. Encoding becomes more expensive as the scope of searching and identification within the image is expanded. Techniques of the present disclosure improve coding efficiency by defining conditions under which IBC is performed. That is, the techniques of the present disclosure may define a search area for coding a current block. The defined search area may be smaller than the entirety of the previously coded portion 202. This reduces the computational expense and inefficiencies of conventional methods. Specification of the conditions as further described herein can advantageously reduce complexity, especially in hardware decoders, given the relatively high complexity and memory requirements of IBC. Also, if in-loop processing (e.g., deblocking/SAO) is performed, conventional methods when using IBC may need to store an encoded image in two modes: a version with the in-loop processing and another version without the in-loop processing. This is because IBC may be restricted to handling only non in-loop processed samples. For example, the source pixel block 308 from which the current pixel block 306 is predicted may not have been output from a de-blocking filter or SAO filter. Thus, if in-loop processing is performed, conventional methods may require additional storage space to store both versions or need to delay processing until the end of the encoding process for the entire picture. Delaying processing may impact the efficiency of the encoding and/or decoding process, increase memory bandwidth and power consumption and potentially add to the cost of the implementation. Methods and systems of the present disclosure provide for signaling (from an encoder to a decoder) of those areas that are considered when performing IBC for an image or an area of the image. For example, the signaling may be output from encoder system 100 and may indicate a distance from a current block within which reference data may be used for prediction. This may eliminate the need to simultaneously store at a decoder two versions of a same image or appropriately staging creation of a second reference, which conserves decoder resources.

FIG. 3B is a conceptual diagram of video encoding using IBC according to an embodiment of the present disclosure. FIG. 3B shows a partially reconstructed picture 320 having a shaded portion 322 that is coded (e.g., LCUs 0-54) and a portion 324 that is not yet coded (shown as the blank boxes). In an embodiment, IBC may be performed subject to one or more thresholds. One or more of the thresholds may be level dependent, i.e. restricted according to the capabilities of the encoding and decoding devices, such as memory and processing power. These thresholds may be defined with respect to a distance relative to a current pixel block 326 being coded. Coding may be performed using IBC if a threshold is met. An IBC mode may include performing an intra prediction scheme that allows specification of a position within a current image that has already been encoded as the basis for prediction. For example, the position may be specified as a vector 328 (<x, y>). The vector may be defined similarly to motion vectors for inter prediction. Otherwise, if the threshold is not met, coding may be performed according to a default coding method, i.e. without referencing those regions outside the threshold.

In an embodiment, an IBC threshold distance may be defined with respect to a height threshold 332. The height threshold may specify a maximum vertical distance in which previously-coded blocks may be used for coding a current pixel block 326. In other words, the height threshold may define a maximum vertical distance of a search for possible reference portions. The height threshold may be defined in samples, LCUs, and the like. For instance, the height threshold may define a search area in terms of a number of pixel rows. In the example shown in FIG. 3B, the height threshold is five blocks, i.e. LCUs. In this embodiment, the current LCU row may also be included in this threshold computation. In an alternative embodiment, the current LCU row may not be included in the threshold. Thus, a search may be performed for a current block 306 using any data corresponding to blocks within the current row and previous four rows, i.e., data that are within LCUs 0-54. In an alternative embodiment, the current row is excluded from the threshold computation and only the rows above the current row are considered.

In another embodiment, an IBC mode may be defined with respect to a block threshold. The block threshold may specify a number of past consecutive blocks prior to the current pixel block 326 that are usable as a source for prediction for IBC. In this case, this number of blocks may correspond to a number of, for example, fixed size CUs or LCUs in HEVC. The size of blocks indicated by the block threshold may or may not be the same size as the pixel blocks being predicted. For example, the block threshold may specify a number of past consecutive blocks usable for prediction for IBC. The block threshold may be defined such that those blocks falling outside the block threshold are not to be used for coding because, for example, the computational cost of using those blocks outweighs the benefit of referencing those blocks. The block threshold may be defined in samples, LCUs, and the like. For instance, the block threshold may define a search area in terms of a number of pixels. In the example shown in FIG. 3B, the block threshold 334 is 30 LCUs. Thus, a search may be performed for a current block 306 using any samples that are within the previous 31 LCUs, i.e., LCUs 0-30 (represented by the darker shading in FIG. 3B).

FIG. 3C is a conceptual diagram of video encoding using IBC according to an embodiment of the present disclosure. FIG. 3C shows a partially reconstructed picture 340 having four tiles, tile 342.1, tile 342.2, tile 342.3, and tile 342.4, each having a portion 342.0, 342.1, 342.2, and 342.3 that is coded (e.g., LCUs 0-54) and a portion 344.0, 344.1, 344.2, and 344.3 that is not yet coded (shown as the blank boxes). For simplicity, the vector, block, and thresholds of tile0, tile2, and tile3 are not labeled.

The techniques described herein, e.g., with respect to FIG. 3B may be applied to each of the tiles shown in FIG. 3C. In an embodiment, techniques may be applied independently for each tile. In an embodiment, IBC using pixels from certain areas may be performed subject to one or more thresholds. One or more of the thresholds may be level dependent, restricted according to the capabilities of the encoding and decoding devices, such as memory and processing power. These thresholds are basically defined with respect to a distance relative to a current block being coded. For example, in tile 342.1, a threshold distance may be specified by height threshold 344.1 or an LCU count threshold 350.1 measured from a current pixel block 352.1. Coding and prediction from certain areas for the current block may be performed using IBC if a threshold is met. An IBC mode may include performing an intra prediction scheme that allows specification of a position within a current image that has already been encoded for prediction. For example, the position may be specified as a vector (<x, y>). The vector may be defined similarly to motion vectors for inter prediction. Otherwise, coding may be performed according to a default coding method, i.e. without reference to previously reconstructed blocks in the picture.

FIG. 4 is a flowchart of a method 400 to encode data according to an embodiment of the present disclosure. The method 400 may be implemented by the systems described herein, e.g., the encoder system 100 shown in FIG. 1.

As shown, the method 400 may be performed as part of an IBC search and may code a current block based on previously-coded samples in the same image. The method 400 may perform boxes 402, 404, 406, and 408 for each coded block, i.e. for all possible positions in an image as defined by a vector <x, y>. The method 400 may determine whether a previously-coded area in the current picture, which defines a prediction block, meets a height threshold (box 402). A prediction block may meet a height threshold if it is within a search area as specified by the height threshold and described herein. If a current prediction does not meet the height threshold, the method may proceed to a next block (box 404). In an embodiment, the method 400 may discard, from memory, a block when proceeding to a next block (box 404) such that the discarded block is not used for IBC. If the prediction block meets the height threshold, the method 400 may determine whether the prediction block meets a block threshold (box 406). If the prediction block does not meet the block threshold, the method may proceed to the next block (box 404). In an embodiment, the method 400 may discard, from memory, a block that does not meet the defined threshold criteria when proceeding to a next block (box 404) such that the discarded block is not further used for IBC. If the prediction block meets both the block threshold and the height threshold, the method 400 may then consider the prediction block as an IBC candidate within the IBC search (box 408). The coding of the current block according to IBC may include specifying a vector pointing to a prediction block in the previously-coded area of the current picture (not shown). The vector may indicate that the current block should be coded according to the prediction block.

FIG. 5A is a flowchart of a method 500 to decode data according to an embodiment of the present disclosure. The method 500 may be implemented by the systems described herein, e.g., a decoder system. The method 500 may save memory by removing a region from memory when the method determines that the region is outside of a defined area.

The method 500 may begin decoding a current block by performing a scan of blocks. The scan may be performed regardless of mode, e.g., IBC or other mode. The method 500 may determine a height threshold and a block threshold for a current block (box 502). The thresholds may be received as metadata in the bitstream or be predefined according to the level and/or profile of the bitstream. The method 500 may determine whether a region of the current picture is outside an area defined by the height and block thresholds for a current block (box 504). A previously-coded block may meet a height threshold if it is within a search area as specified by the height threshold and described herein. A previously-coded block may meet a block threshold if it is within a search area as specified by the block threshold and described herein.

If a region is outside the height and block thresholds, that region may be relinquished as not required for IBC processing. In the embodiment of FIG. 5A, the method 500 may perform optional box 506 to relinquish resources associated with the region, depending on decoder implementation. In an embodiment, resources can be "freed" given the height and block threshold. In decoder implementations where samples are retained in both a deblocked and non-deblocked format, to accommodate the IBC mode, non-deblocked versions of areas that no longer meet that threshold can be freed from memory (box 506). Unlike conventional methods that simultaneously store both deblocked and non-deblocked versions, method 500 may store a single version. In some embodiments here, the non-deblocked version is preserved until it is beyond the height and block thresholds. Then, as the decoding process progresses, the portion of the image that passes the thresholds can be relinquished.

In an embodiment, the method may respond to the region being outside of the height and block thresholds by performing pre-defined function(s) such as the ones described herein. In another embodiment, the method 500 may not take the height and block thresholds into consideration for saving resources. That is, the method 500 may elect to keep both alternatives (i.e., not save any memory) or wait to deblock at the end of the encoding process for the picture.

FIG. 5B is a flowchart of a method 550 to decode data according to another embodiment of the present disclosure. The method 550 may be implemented by the systems described herein, e.g., a decoder system. The method 550 may save memory by using a sole memory, and scheduling deblocking.

The method 550 may begin decoding a current block by performing a scan of blocks. The scan may be performed regardless of mode, e.g., IBC or other mode. The method 550 may determine a height threshold and a block threshold for a current block (box 552). The thresholds may be received as metadata in the bitstream or be predefined according to the level and/or profile of the bitstream. The method 550 may determine whether a region of the current block is outside an area defined by the height and block thresholds (box 554). A previously-decoded block may meet a height threshold if it is within a search area as specified by the height threshold and described herein. A previously-decoded block may meet a block threshold if it is within a search area as specified by the block threshold and described herein.

If a region is outside the height and block thresholds, the method 550 may relinquish resources associated with that region by performing optional box 556, depending on decoder implementation. In an embodiment, deblocking can be scheduled given the height and block threshold. If the entire region is within the area defined by the height and block thresholds (i.e. box 554 evaluates to "no"), no deblocking can yet be performed because IBC is typically incompatible with samples in deblocked form. The method 550 may schedule deblocking for this block (box 556) and after this operation is performed, remove its non-deblocked version from memory, thus saving space. In an embodiment, a sole memory buffer is used. That can help better utilize resources and save memory.

Although methods 400, 500, and 550 are described as first determining whether a prediction block meets a height threshold, it is also possible to determine whether the prediction block meets a block threshold first. In an embodiment, a search area for a current block may be limited by whichever of the thresholds is reached first. In an alternative embodiment, a search area for a current block is limited by both thresholds. Compared with conventional methods, this may better account for different resolutions as well as tiles in HEVC. For example, consider the case where the block threshold is 30 and the height threshold is 2 block heights. In this scenario, for a current block for which an IBC prediction is being made, those blocks of distance 30 and 29 are not usable despite being within the block threshold. This is because blocks 30 and 29 are beyond the height threshold, which permits use of blocks 0-28. When the tile or image margin is passed, and the current block is at a lower block height, all 30 blocks specified by the block threshold may then be usable for prediction.

In an embodiment, the techniques described herein may be performed without syntax changes to the HEVC specification. For example, the techniques may be implemented based on semantics. In an alternative embodiment, one or more syntax elements may trigger performance of the techniques described herein. For example, syntax elements may be added in video usability information (VUI) metadata to specify the conditions/thresholds described herein. As another example, two or more syntax elements may define conditions for applying IBC (e.g., similar to the motion vector limits). For example, a limit ibc_max_lcu_height_distance may specify the height limit, and ibc_max_num_past_lcus may specify the block limit. These limits could be further constrained by the motion vector limitations, i.e. log2_max_mv_length_horizontal and log2_max_mv_length_vertical. That is, the specified vectors for IBC may have to satisfy both the height and block distance thresholds, but also the motion vector limits in the VUI. Alternatively, the height and block distance thresholds can also be completely independent from one another.

Methods and systems of the present disclosure provide improved deblocking for video coding, such as, but not only, screen content coding. Conventional deblocking techniques in HEVC provide only two cases for chroma samples: no filtering and normal filtering. Normal filtering is applied only when the filter strength is greater than one. Thus, conventional deblocking techniques in HEVC may be insufficient for chroma components because deblocking is only enabled when a block is, or is neighboring, an intra block. In the screen content coding case, this conventionally also excludes intra block copy partitions since these are commonly also considered as being equivalent to inter partitions. This can result in noticeable blocking artifacts in the chroma (or RB planes if RGB encoding is used), especially in relatively active, motion wise, regions in an image. The blocking artifacts may be especially noticeable in high dynamic range (HDR) material. Subjective as well as objective improvements may be achieved based on the deblocking techniques described herein.

In an embodiment, the same process as for luma deblocking is performed for chroma planes as an option for screen content coding 4:4:4 material. Luma deblocking may be reused as an extra deblocking mode (e.g., switch at the slice or picture level) for color planes. The luma deblocking process on chroma planes may be performed in accordance with the HEVC specification. In another embodiment, deblocking may be also allowed when boundary filtering strength is 1. This may be especially helpful for 4:2:0 material, screen content coding (due to IBC), but is applicable to all formats.

In an embodiment, allowing luma deblocking on chroma planes may be signaled using a parameter in a slice header or picture parameter set. For example, the parameter may have two states for 4:2:0 and 4:2:2 material. As another example, the parameter may have three states for 4:4:4 material. Example states and corresponding functions are shown in Table 1. In an embodiment, state B the chroma deblocking may depend on motion/mode/residual information. For example, intra blocks or intra block neighbors are classified as having block filter strength (BFS)=2, inter blocks with particular motion characteristics that have residuals are classified as BFS=1 and everything else including skipped blocks are classified as BFS=0. In an embodiment, state C is available only for 4:4:4. The deblocking techniques may be performed by the systems described herein, e.g., the deblocking filter 134 shown in FIG. 1.

TABLE 1

| State | Function |
|-------|----------|
| A | default/current mode or chroma deblocking |
| B | enable deblocking using the existing chroma deblocking filters also for Block Filter Strength (BFS) = 1 |
| C | use luma deblocking for chroma planes |

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims. For example, embodiments of the present disclosure may provide a method of coding; a non-transitory computer readable medium storing program instructions that, when executed by a processing device, causes the device to perform one or more of the methods described herein; a video coder, etc.

The techniques described herein may be implemented by executing instructions on a computer-readable medium, wherein the "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments, which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement encoding optimization in video coding applications. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

The invention claimed is:

1. A system for video decoding, comprising a processor and memory, the memory containing instructions that, when executed on the processor, cause the system to at least:
   decode coded video data received from a channel on a pixel block-by-pixel block basis,
      wherein the decoding comprises determining an intra prediction of the given pixel block from pixel data contained within a source region of a buffer; store the decoded pixel blocks in the buffer;
   determine a height limit for limiting the source region measured in samples of video data;
   determine a block count for limiting the source region measured in decoded pixel blocks of video data;
   following the decoding of the given pixel block, adjust the source region to include a first portion of pixel data of a current image that is closer to the given pixel block than both the height limit and the block count and to not include a second portion of pixel data of the current image that is further from the current block count than either the height limit or the block count.

2. The system of claim 1, wherein:
   the current image is divided into tiles, the given pixel block and the source region are both contained with a current tile, and the height limit is measured within the current tile.

3. The system of claim 1, wherein the instructions further cause the system to:
   in-loop filter the source region of the buffer prior to the determining a prediction of the given block.

4. The system of claim 1, wherein the instructions further cause the system to:
   in-loop filter the source region of the buffer after the determining of the prediction of the given block.

5. The system of claim 1, wherein the height limit is measured in pixel rows.

6. The system of claim 1, wherein the instructions further cause the system to:
   relinquish the second portion.

7. The system of claim 6, wherein the second portion is relinquished by freeing it from memory.

8. The system of claim 1, further comprising instructions to:
   filter the decoded blocks in the second portion; and
   store the filtered blocks in the buffer.

9. The system of claim 1, wherein the source region is further adjusted based on a distance measured from the current pixel block within the current image.

10. A method for video decoding, comprising:
    decoding coded video data received from a channel on a pixel block-by-pixel block basis,
       wherein the decoding comprises determining an intra prediction of the given pixel block from pixel data contained within a source region of a buffer;
    store the decoded pixel blocks in the buffer;
    determining a height limit for limiting the source region measured in samples of video data;
    determining a block count for limiting the source region measured in decoded pixel blocks of video data;
    following the decoding of the given pixel block, adjusting the source region to include a first portion of pixel data of a current image that is closes to the given pixel block than both the height limit and the block count and to not include a second portion of pixel data of the current image that is further from the current block than either the height limit or the block count.

11. The method of claim 10, wherein the height limit is measured in pixel rows.

12. The method of claim 10, further comprising:
    relinquishing the second portion.

13. The method of claim 12, wherein the second portion is relinquished by freeing it from memory.

14. The method of claim 10, further comprising:
    filtering the decoded blocks in the second portion; and
    storing the filtered blocks in the buffer.

15. The method of claim 10, wherein the source region is further adjusted based on a distance measured from the current pixel block within the current image.

16. A non-transitory computer-readable medium storing instructions that, when executed on a processor, cause:
    decoding coded video data received from a channel on a pixel block-by-pixel block basis,
       wherein the coded video data includes, for a given pixel block, an indication of a reference pixel block and
       wherein the decoding comprises determining an intra prediction of the given pixel block from pixel data contained within a source region of a buffer;
    storing the decoded pixel blocks in the buffer;
    determining a height limit for limiting the source region measured in samples of video data;
    determining a block count for limiting the source region measured in decoded pixel blocks of video data;
    following the decoding of the given pixel block, adjusting the source region to include a first portion of pixel data a current image that is closer to the given pixel block than both the height limit and the block count and to not include a second portion of pixel data of the current image that is further from the current block than either the height limit or the block count.

17. The medium of claim 16, wherein the height limit is measured in pixel rows.

18. The medium of claim 16, wherein the instructions further cause:
   relinquishing the second portion.
19. The medium of claim 18, wherein the second portion is relinquished by freeing it from memory.
20. The medium of claim 16, wherein the instructions further cause:
   filtering the decoded blocks in the second portion; and
   storing the filtered blocks in the buffer.
21. The medium of claim 16, wherein the source region is further adjusted based on a distance measured from the current pixel block within the current image.

* * * * *